(12) United States Patent
Ikeda et al.

(10) Patent No.: US 6,634,006 B1
(45) Date of Patent: Oct. 14, 2003

(54) PACKET DATA COMMUNICATION DEVICE

(75) Inventors: Yutaka Ikeda, Ikoma (JP); Shuichiro Ono, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/469,394

(22) Filed: Dec. 22, 1999

(30) Foreign Application Priority Data

Dec. 25, 1998 (JP) .......................................... 10-368721

(51) Int. Cl.[7] .............................................. G08C 25/02
(52) U.S. Cl. ...................................... 714/748; 714/751
(58) Field of Search .......................... 348/246; 709/228; 370/395; 400/62; 711/163; 714/751, 748

(56) References Cited

U.S. PATENT DOCUMENTS

| | | | | | |
|---|---|---|---|---|---|
| 5,008,739 A | * | 4/1991 | D'Luna et al. | ............. | 348/246 |
| 5,136,716 A | * | 8/1992 | Harvey et al. | ............... | 709/228 |
| 5,946,312 A | * | 8/1999 | Suzuki | ........................ | 370/395 |
| 6,000,864 A | * | 12/1999 | Hanada | ........................ | 400/62 |
| 6,044,445 A | * | 3/2000 | Tsuda et al. | ................. | 711/163 |
| 6,061,820 A | * | 5/2000 | Nakakita et al. | ............ | 714/751 |
| 6,084,880 A | * | 7/2000 | Bailey et al. | ................ | 370/395 |

* cited by examiner

*Primary Examiner*—David Ton
(74) *Attorney, Agent, or Firm*—Birch, Stewart, Kolasch & Birch, LLP

(57) ABSTRACT

A packet data communication device has a lower-layer communication tool including at least a first lower-layer portion without an error-detection and retransmission function, and an upper-layer communication tool having both an IrTran-P function and an error-detection and retransmission function. When the first lower-layer portion is used, the upper-layer communication tool performs error-detection and retransmission of arbitrary-length packet data.

4 Claims, 5 Drawing Sheets

PACKET DATA COMMUNICATION DEVICE

BACKGROUND OF THE INVENTION

The present invention relates to a packet data communication device.

Typical examples of interfaces for connection between information devices are an RS232C interface and Centronics interface. These interfaces, however, do not provide reliable communication channels, thus having a possibility that errors occur. Accordingly, for such interfaces, upper-layer protocols such as BSC (Binary Synchronous Communication), XMODEM, YMODEM and the like having an error-detection and retransmission function have conventionally been used to thereby ensure the reliability.

In addition to the interfaces of the above type, interfaces for infrared data communication are also available, and systems therefor standardized by the IrDA (Infrared Data Association), which is an industry standardization group, have been widely used in notebook personal computers, PDAs (Personal Data Assistants) or the like. An example of the standards of the IrDA is IrTran-P (Infrared Transfer Picture), which has been devised as an image transfer protocol. The IrTran-P is a host or upper protocol of IrCOMM (one of the IrDA standards), which is a protocol that allows devices to be seemingly connected therebetween by RS232C interfaces with the use of the infrared data communication.

However, because the protocol IrTran-P presupposes a reliable lower-layer communication channel, IrTran-P itself is not provided with the error-detection and retransmission function. It has been a precondition for use of IrTran-P that the communication channel reliability is ensured by IrLAP, which is a lower-layer protocol of IrTran-P. Accordingly, IrTran-P could not be used as an upper layer for unreliable lower-layer protocols such as RS232C and Centronics. This is a first problem.

A possible solution to the first problem may be use of BSC, XMODEM, YMODEM or the like having the error-detection and retransmission function as an intermediate layer between an is unreliable communication channel and the IrTran-P protocol to thereby ensure the reliability. However, since the error-detection and retransmission procedure is performed in fixed-length packets in these intermediate layers, a redundant communication processing is involved in the transfer of large volumes of data, causing a second problem that a unnecessarily prolonged communication time is required.

Usually, the error-detection and retransmission procedure is performed throughout data communication. That is, the error-detection and retransmission procedure is performed at all times, from connection setting through data transfer to disconnection, in the intermediate layer. However, in a communication channel in which an error occurs at the time of connection setting, errors would also tend to occur frequently in the subsequent communication, which makes it difficult to normally end the communication. Therefore, the error-detection and retransmission at the connection setting can be considered as redundant. Unfortunately, however, with methods using the aforementioned BSC, XMODEM or YMODEM, it is impossible to suppress the error-detection and retransmission at the connection setting and perform the error-detection and retransmission only after the connection establishment. This is a third problem.

SUMMARY OF THE INVENTION

An object of the invention is therefore to provide a data communication device which can solve the problems described above, and which enables the packet data communication in an IrTran-P format even when an unreliable lower-layer transmission channel such as RS232C is used.

According to the present invention, there is provided a packet data communication device, comprising:

a lower-layer communication means including at least a first lower-layer portion having no error-detection and retransmission function; and an upper-layer communication means having an IrTran-P function and an error-detection and retransmission function, wherein when the first lower-layer portion is used, the upper-layer communication means performs error-detection and retransmission of arbitrary-length packet data.

With this arrangement, because the upper-layer communication means has a function of performing an error-detection and retransmission of arbitrary-length packet data, the IrTran-P protocol can be used as an upper layer of an unreliable lower-layer protocol such as RS232C or Centronics. That is, the present invention solves the first and second problems described above.

Further, because the error-detection and retransmission is performed in the upper-layer communication means for each of arbitrary-length packets, and not fixed-length packets, less processing is required for the error-detection and retransmission even when a large volume of data is transferred.

In one embodiment, the lower-layer means includes the first lower-layer portion and a second lower-layer portion having an error-detection and retransmission function and the upper-layer communication means has a function of selecting one of the first and the second lower-layer portions. When the first lower-layer portion having no error-detection and retransmission function is used, the upper-layer communication means performs error-detection and retransmission of arbitrary-length packet data. When the second lower-layer portion having an error-detection and retransmission function is used, the upper-layer communication means does not perform the error-detection and retransmission of the arbitrary-length packet data.

In one embodiment, when the first lower-layer portion having no error-detection and retransmission function is used, the upper-layer communication means does not perform the error-detection and retransmission at a time of connection setting, and once the connection is established, the upper-layer communication means performs the error-detection and retransmission during communications subsequent to the connection establishment. This embodiment solves the third problem described above. If an error has occurred at the time of connection setting, preferably a connection setting procedure may be restarted without performing the error-detection and retransmission.

Other objects, features and advantages of the present invention will be obvious from the following description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinbelow, an embodiment of the present invention is described concretely with reference to the accompanying drawings.

Figure 2:
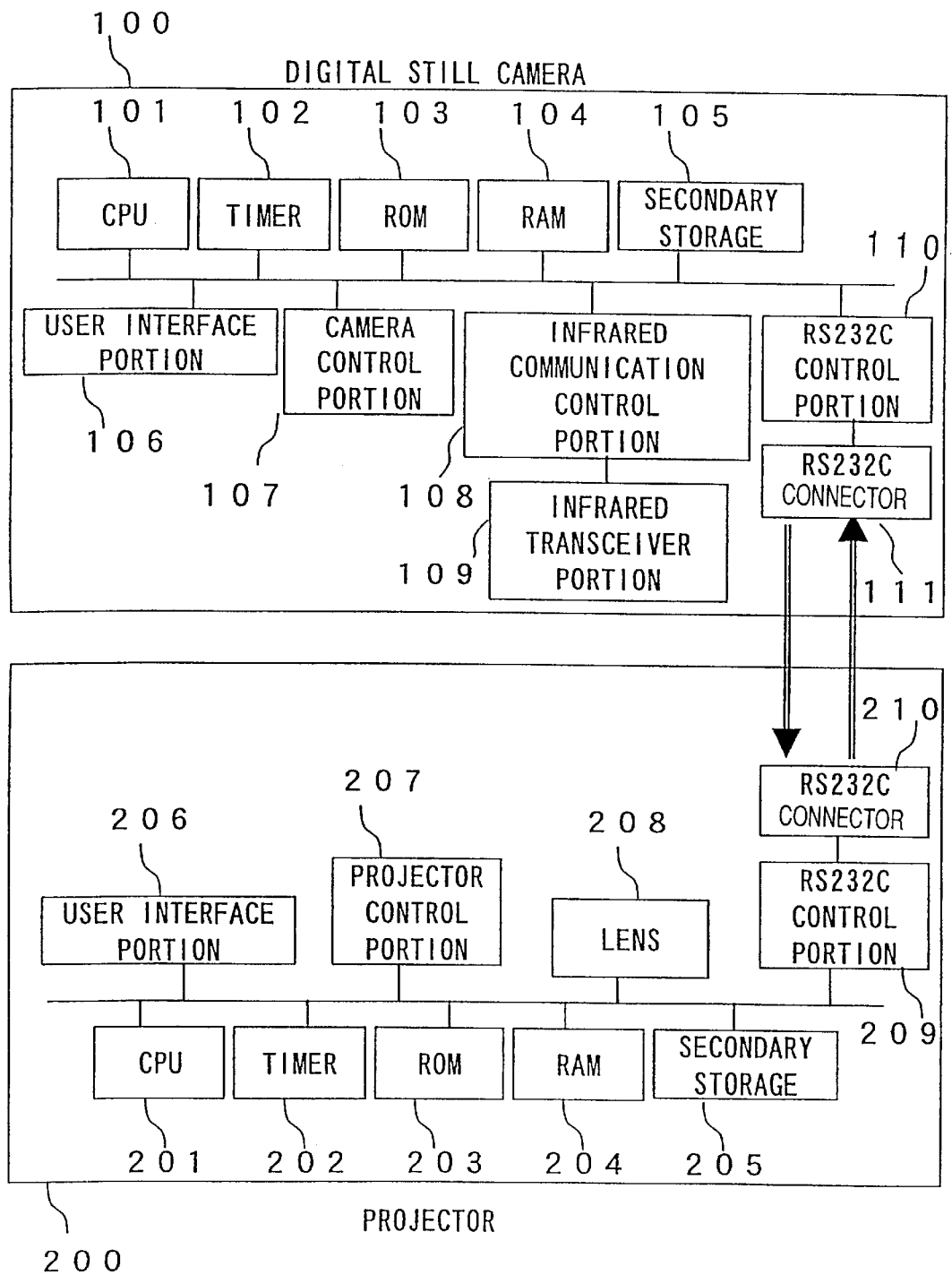
FIG. 2 is a block diagram of the packet data communication system.

FIG. 2 is a block diagram of a packet data communication system having communication devices according to the present invention. The system comprises a digital still camera 100 and a projector 200 each serving as a packet data communication device.

Reference numeral 101 denotes a CPU which controls the whole digital still camera 100, 102 denotes a timer having a function of making a time elapse known, 103 denotes a ROM in which programs to be executed by the CPU 101 are stored, 104 denotes a RAM for storing data to be used by the CPU 101, 105 denotes a secondary storage for storing captured image data. Also, reference numeral 106 denotes a user interface portion which performs things such as recognition of operations by the user, display of images, and the like, 107 denotes a camera control portion which performs control of an image pickup device, processing of images, and the like, 108 denotes an infrared communication control portion which performs operations such as modulation and demodulation of infrared communications, 109 denotes an infrared transceiver portion which performs transmission and reception of infrared rays, 110 denotes an RS232C control portion which performs operations such as modulation and demodulation of RS232C communications, and 111 denotes an RS232C connector.

Reference numeral 201 denotes a CPU which controls the whole projector 200, 202 denotes a timer having a function of making a time elapse known, 203 denotes a ROM in which programs to be executed by the CPU 201 are stored, 204 denotes a RAM for storing data to be used by the CPU 201, and 205 denotes a secondary storage for storing data to be projected onto a screen. Also, reference numeral 206 denotes a user interface portion which recognizes operations by the user, 207 denotes a projector control portion which controls the projector in color, focus, and the like, 208 denotes a lens for outputting an image onto the screen, 209 denotes an RS232C control portion which performs operations such as the modulation and demodulation of RS232C communications, and 210 denotes an RS232C connector.

Figure 3:
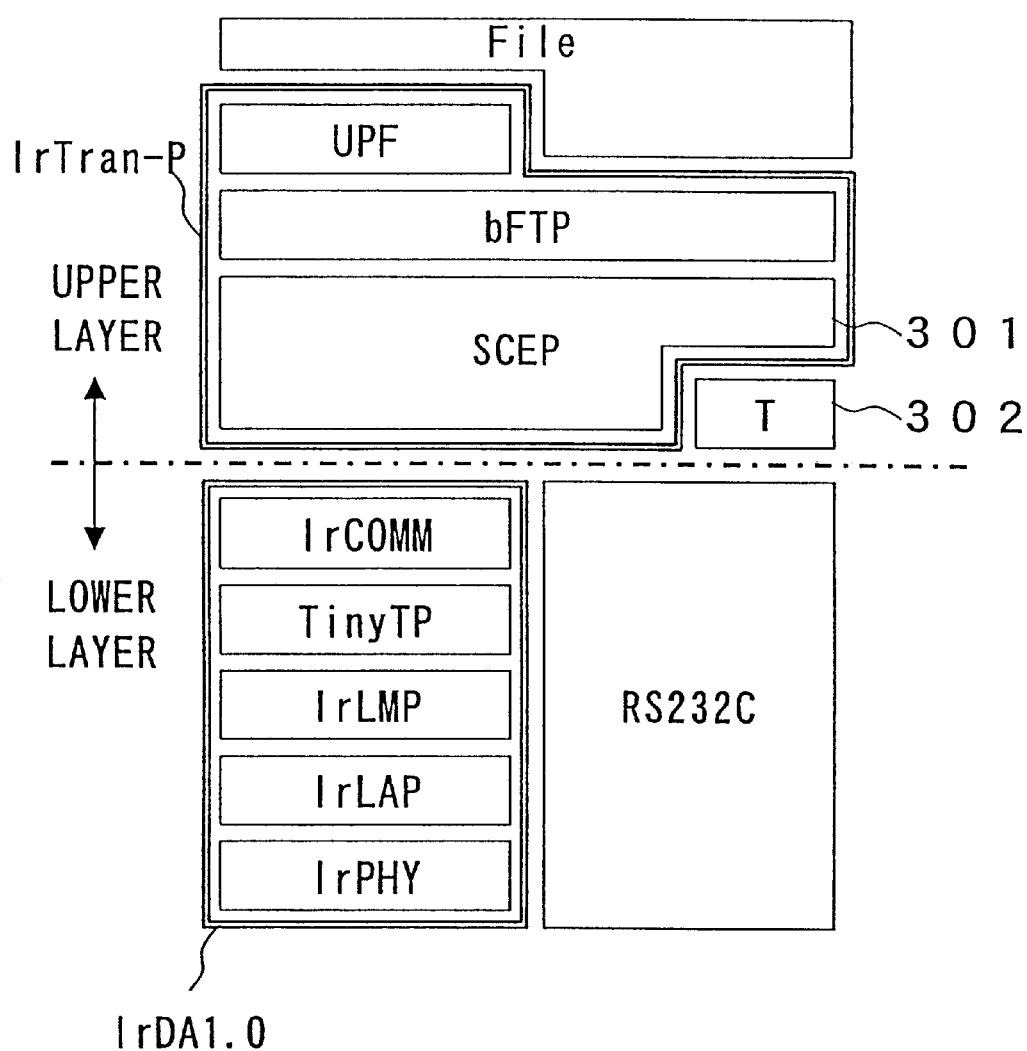
FIG. 3 shows a protocol stack for a digital still camera in the embodiment.

FIG. 3 shows a protocol stack of the digital still camera in this embodiment. The digital still camera is equipped with a lower-layer communication section including IrDA 1.0 and RS232C, and an upper-layer communication section including IrTran-P and a T layer which has an error-detection and retransmission function. In this case, the T layer is capable of setting data packets to arbitrary lengths, and the error-detection and retransmission function of the T layer is realized by adding a CRC16 (Cyclic Redundancy Check-CCITT) to every packet.

Figure 4:
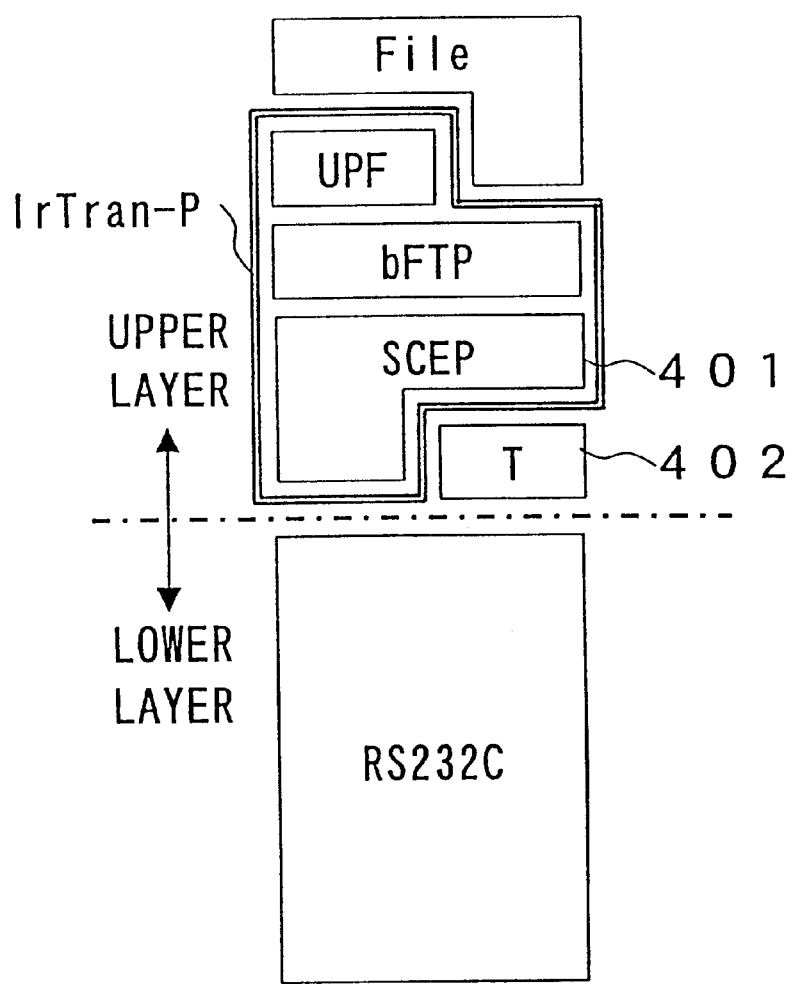
FIG. 4 shows a protocol stack for a projector in the embodiment.

FIG. 4 shows a protocol stack of the projector in this embodiment. The projector is equipped with a lower-layer communication section having only RS232C, and an upper-layer communication section including IrTran-P and a T layer with an error-detection and retransmission function.

As shown in FIGS. 3 and 4, the IrDA 1.0 comprises IrPHY, IrLAP, IrLMP, TinyTP and IrCOMM, and the IrTran-P comprises SCEP, bFTP and UPF.

Figure 1:
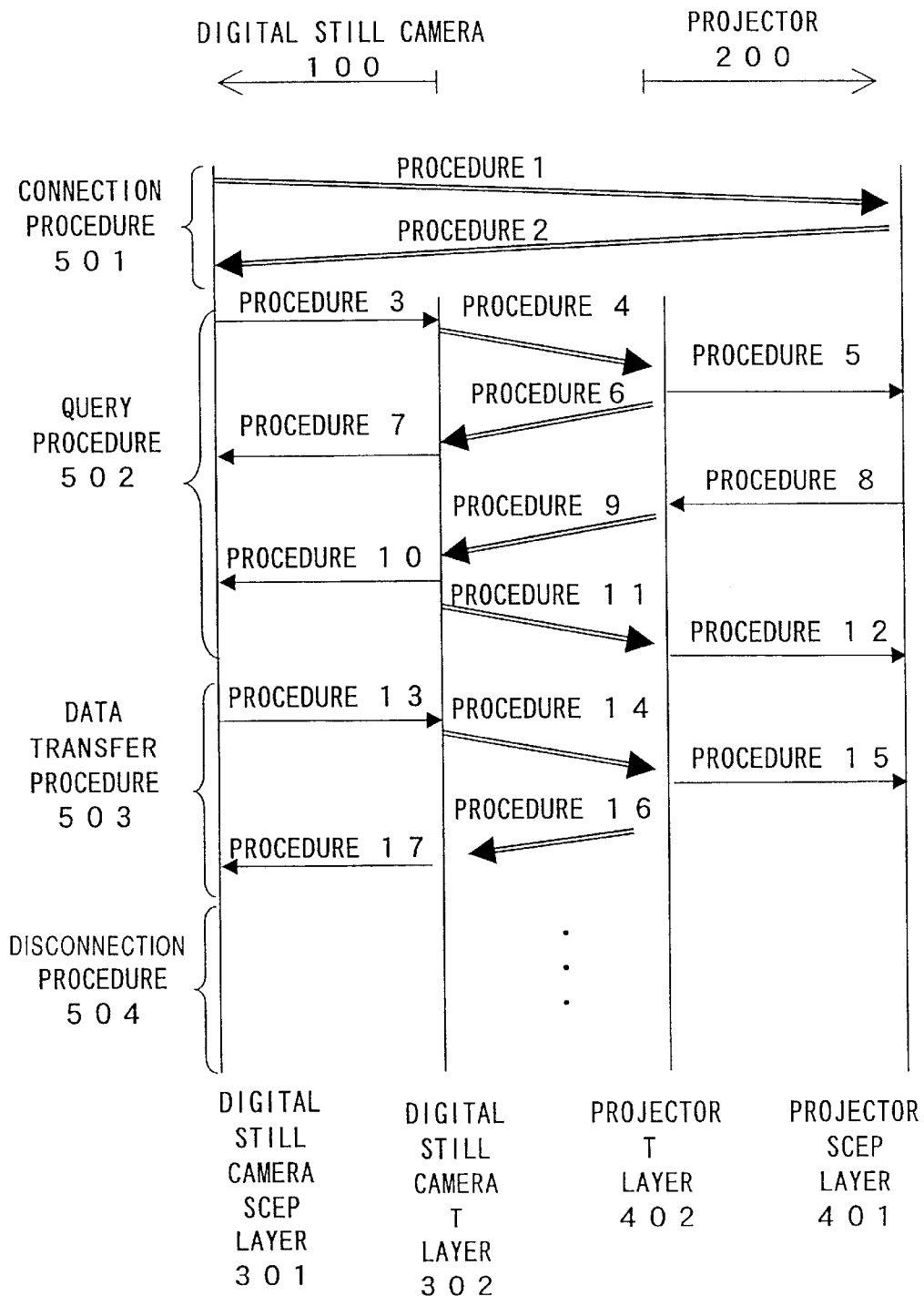
FIG. 1 shows communication procedures for data transmission in a packet data communication system comprising packet data communication devices according to an embodiment of the present invention.

FIG. 1 shows communication procedures for transmitting image data from the digital still camera 100 to the projector 200.

In FIG. 1, single solid lines represent data transmission and reception within the upper-layer communication section inside each device, and double lines represent data transmission and reception between the upper-layer communication section and the lower-layer communication section, including communications between the devices.

First of all, a connection procedure 501 is performed. In this procedure, regardless of whether the lower-layer communication section has an error-detection and retransmission function or not, direct communication is performed between a digital still camera SCEP layer 301 and a projector SCEP layer 401 without using the T layers 302 and 402.

The digital still camera SCEP layer 301 sends a connection request protocol to the projector SCEP layer 401 (Procedure 1). If the projector 200 is ready for processing, then the projector SCEP layer 401 sends a connection acceptance protocol to the digital. still camera SCEP layer 301 (Procedure 2). The connection request and connection acceptance protocols include information as to whether each device has a T layer in the respective upper-layer communication sections. At a time point when Procedure 2 has been completed, it is decided whether or not the T layer should be used as an upper-layer communication tool.

When both the digital still camera and the projector have a T layer in the respective upper-layer communication sections, data communication is performed through the T layers. In this embodiment, because both the digital still camera and the projector have the T layer 302, 402 within the respective upper-layer communication sections, as shown in FIGS. 3 and 4, data communication is performed through the T layers 302 and 402.

Next, a query procedure 502 is performed. This procedure involves information as to parameters, such as communication speed, communication buffer size, image size, number of colors and so on, that can be dealt with by individual devices. Upon completion of the query procedure 502, those parameters to be used in the subsequent communication between the two devices are determined.

The digital still camera SCEP layer 301 transmits image data to the digital still camera T layer 302 (Procedure 3). The digital still camera T layer 302 adds CRC16 to the image data in arbitrary-length packets and transmits the data to the projector T layer 402 (Procedure 4). The projector T layer 402 performs a CRC (cyclic redundancy check), and if it is verified that normal reception has been done without any error detection, the projector T layer 402 transmits the image data to the projector SCEP layer 401, which is an upper layer (Procedure 5). Also, the projector T layer 402 transmits data added with the CRC16 to the digital still camera T layer 302 to notify it of the fact that normal reception has been done (Procedure 6). The digital still camera T layer performs a CRC on received packets in Procedure 6, and if normal reception has been done, the digital still camera T layer 302 notifies the digital still camera SCEP layer 301 of the fact that Procedure 3 has been completed normally (Procedure 7).

Meanwhile, the projector SCEP layer 401 transmits to the projector T layer 402 response data for the image data received by Procedure 5 (Procedure 8). The projector T layer 402 adds CRC16 to the data in arbitrary-length packets and transmits the packets to the digital still camera T layer 302 (Procedure 9). The digital still camera T layer 302 performs a CRC check. As a result, if it is verified that normal reception has been done without any error detection, the digital still camera T layer 302 transmits the data to its upper layer, digital still camera SCEP layer 301 (Procedure 10).

Also, the digital still camera T layer 302 transmits data added with the CRC16 to the projector T layer 402 to notify it of the fact that normal reception has been done (Procedure 11). The projector T layer 402 performs a CRC check on received packets by Procedure 11, and if normal reception has been done, the projector T layer 402 notifies the projector SCEP layer 401 of the fact that Procedure 8 has been normally ended (Procedure 12).

The query procedure 502 is now completed. Subsequently to this on, a data transfer procedure 503 is performed, and upon completion of the data transfer procedure, a disconnection procedure 504 is performed. The data transmission from the digital still camera 100 to the projector 200 is the same as Procedures 3 to 7, the data transmission from the projector 200 to the digital still camera 100 is the same as Procedures 8 to 12. Therefore, description of these procedures is omitted.

Figure 5:
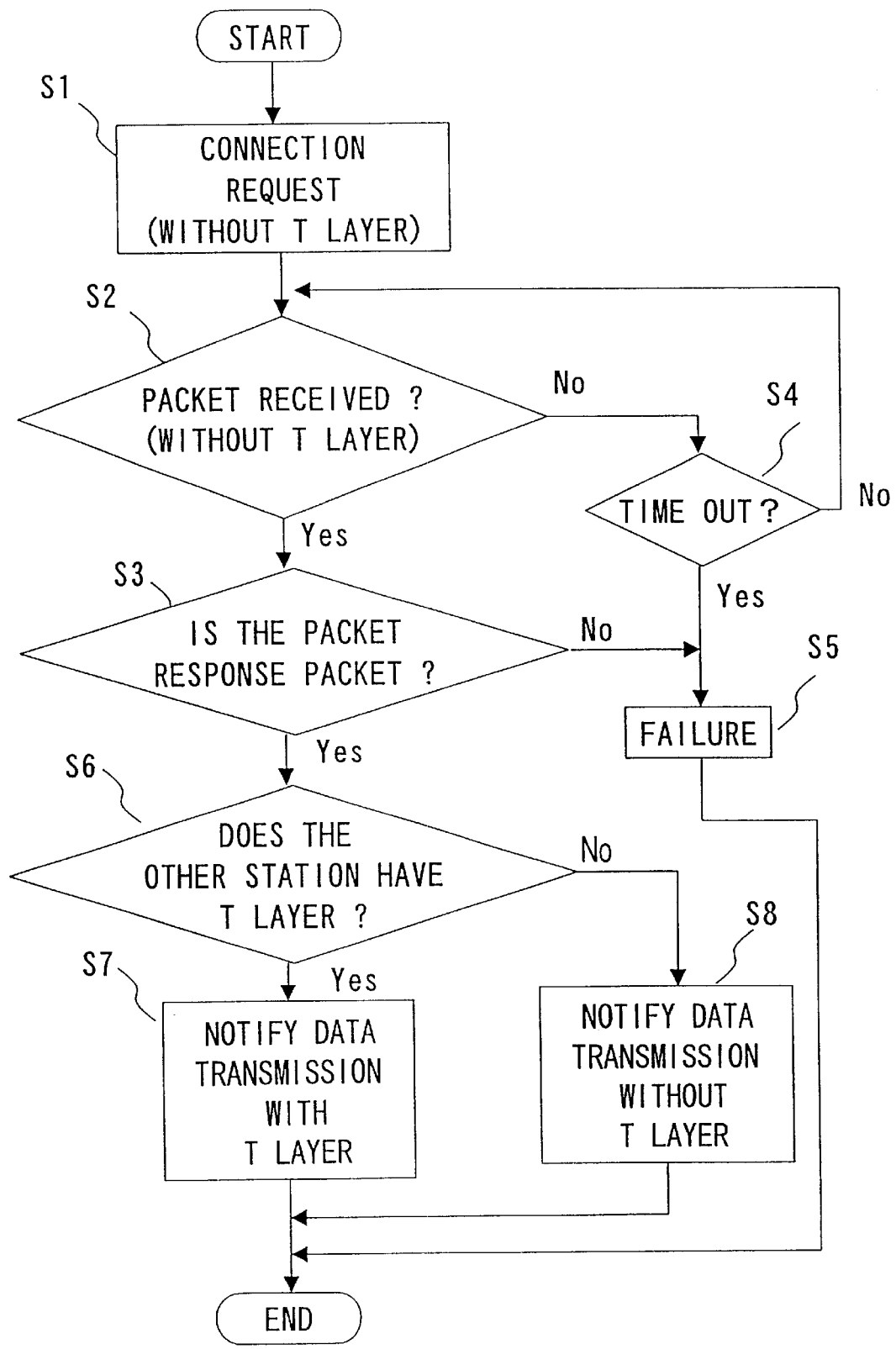
FIG. 5 is a flowchart relating to a connection procedure 501 in the embodiment.

FIG. 5 is a flowchart of relating to the connection procedure 501, which shows a part of programs for a device having both a reliable lower-layer communication channel (IrDA 1.0 in this embodiment) and an unreliable lower-layer communication channel (RS232C in this embodiment), and including a T layer in the upper-layer communication section. As can be seen from FIG. 1, in the connection procedure 501, even a device having the T layer performs communication without using the T layer. That is, in the connection procedure 501, the error-detection and retransmission is not performed in the upper-layer communication section. If an error has occurred, the connection procedure 501 is restarted from the beginning.

First, a communication request protocol is transmitted at step S1, and the program goes to step S2. If a packet is received at step S2, then the program goes to step S3. Otherwise, the program goes to step S4. If the received packet is a normal packet (i.e., a response packet) at step S3, then the program goes to step S6. Otherwise, the program goes to step S5. If no packets have been received within a prescribed time period, the program decides a time-out at step S4 and goes to step S5. If the prescribed time period has not elapsed, the program returns to step S2. At step S5, it is notified that the connection procedure 501 has failed, and the connection procedure 501 is ended. At step S6, if it is found out that the other station has a T layer, the program goes to step S7; if it is found out that the other station does not have a T layer, the program goes to step S8. At step S7, it is notified that the subsequent data transmission will be performed with the T layer (that is, using a lower-layer communication section having no error-detection and retransmission function), and the connection procedure 501 ends. On the other hand, at step S8, it is notified that the subsequent data transmission will be performed without the T layer (that is, using a lower-layer communication tool having an error-detection and retransmission function), and the connection procedure 501 ends.

In this embodiment, if the other station has a T layer, the program goes to step S7. In this case, the subsequent communication procedures are as described above (see FIG. 1).

If the other station does not have a T layer, the program goes to step S8. In this case, the other station also needs to have a lower-layer communication section having an error-detection and retransmission function, such as IrDA 1.0. If the other station does not have a T layer within the upper-layer communication section and is provided with an unreliable lower-layer communication channel such as RS232C, then the resultant communication device as a whole will be not equipped with the error-detection and retransmission function, in which case, apparently, reliability cannot be ensured.

With the above procedures, communication can be performed by deciding whether or not the other station has a T layer, and by selecting a suitable lower-layer communication portion according to the decision.

Although packet data communications between the digital still camera 100 and the projector 200 have been described in this embodiment, it is needless to say that the present invention is not limited to these devices and is applicable to any communication device or equipment that performs communication using packet data.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A packet data communication device, comprising:

a lower-layer communication means including at least a first lower-layer portion having no error-detection and retransmission function; and an upper-layer communication means having an IrTran-P function and an error-detection and retransmission function, wherein when the first lower-layer portion is used, the upper-layer communication means performs error-detection and retransmission of arbitrary-length packet data.

2. The packet data communication device according to claim 1, wherein the lower-layer means includes the first lower-layer portion and a second lower-layer portion having an error-detection and retransmission function;

the upper-layer communication means has a function of selecting one of the first and the second lower-layer portions; and wherein when the first lower-layer portion having no error-detection and retransmission function is used, the upper-layer communication means performs error-detection and retransmission of arbitrary-length packet data, and when the second lower-layer portion having an error-detection and retransmission function is used, the upper-layer communication means does not perform the error-detection and retransmission of the arbitrary-length packet data.

3. The packet data communication device according to claim 1, wherein when the first lower-layer portion having no error-detection and retransmission function is used, the upper-layer communication means does not perform the error-detection and retransmission at a time of connection setting, and once the connection is established, the upper-layer communication means performs the error-detection and retransmission during communications subsequent to the connection establishment.

4. The packet data communication device according to claim 1, wherein when an error has occurred at a time of connection setting, a connection setting procedure is restarted without performing the error-detection and retransmission.

* * * * *